United States Patent
Cole et al.

(10) Patent No.: US 11,662,729 B2
(45) Date of Patent: May 30, 2023

(54) SUBMERSIBLE INSPECTION DEVICE AND WIRELESS COMMUNICATION WITH A BASE STATION

(71) Applicant: HITACHI ENERGY SWITZERLAND AG, Baden (CH)

(72) Inventors: Gregory A. Cole, West Hartford, CT (US); William J. Eakins, Bloomfield, CT (US); Daniel T. Lasko, East Granby, CT (US); Harshang Shah, Ballwin, CT (US); Thomas A. Fuhlbrigge, Ellington, CT (US); Carlos W. Morato, Avon, CT (US); Biao Zhang, West Hartford, CT (US); Luiz Cheim, St. Charles, MO (US); Poorvi Patel, Ballwin, MO (US); Gregory F. Rossano, Enfield, CT (US); Andrew Salm, West Hartford, CT (US)

(73) Assignee: HITACHI ENERGY SWITZERLAND AG, Baden (CH)

( * ) Notice: Subject to any disclaimer, the term of this patent is extended or adjusted under 35 U.S.C. 154(b) by 511 days.

(21) Appl. No.: 16/434,619

(22) Filed: Jun. 7, 2019

(65) Prior Publication Data
US 2019/0286146 A1   Sep. 19, 2019

Related U.S. Application Data

(63) Continuation of application No. PCT/IB2017/001797, filed on Dec. 7, 2017.
(Continued)

(51) Int. Cl.
*G05D 1/02* (2020.01)
*B63G 8/00* (2006.01)
(Continued)

(52) U.S. Cl.
CPC ........... *G05D 1/0206* (2013.01); *B63G 8/001* (2013.01); *B63G 8/08* (2013.01); *G05D 1/0022* (2013.01);
(Continued)

(58) Field of Classification Search
CPC .. G05D 1/0206; G05D 1/0022; G05D 1/0094; H04B 13/02; G21C 17/013;
(Continued)

(56) References Cited

U.S. PATENT DOCUMENTS

2007/0125289 A1   6/2007  Asfar et al.
2009/0315657 A1*  12/2009 Hoffman ............... H01F 27/085
                                                         336/57
(Continued)

FOREIGN PATENT DOCUMENTS

WO        20140120568 A1    8/2014

OTHER PUBLICATIONS

International Search Report and Written Opinion for International application No. PCT/IB2017/001797, dated Nov. 6, 2018, 15 pages.

*Primary Examiner* — Jeff A Burke
*Assistant Examiner* — Sihar A Karwan
(74) *Attorney, Agent, or Firm* — Sage Patent Group

(57) ABSTRACT

A submersible inspection drone used for inspection of liquid cooled electrical transformers can include a number of separate cameras for imaging the internal structure of the transformer. The submersible can be configured to communicate to a base station using a wireless transmitter and receiver. The cameras on the submersible can be fixed in place and can be either static or motion picture cameras. The submersible can include an input/output selector capable of switching between the camera images, either through commanded action of a user or through computer based switching. In one form the input/output selector is a multiplexer.

(Continued)

The base station can be configured to display images from the cameras one at a time, or can include a number of separate viewing portals in which real time images are displayed. The base station can include a demultiplexer synchronized to the multiplexer of the submersible.

28 Claims, 3 Drawing Sheets

Related U.S. Application Data

(60) Provisional application No. 62/431,332, filed on Dec. 7, 2016.

(51) Int. Cl.

| | | |
|---|---|---|
| *B63G 8/08* | (2006.01) | |
| *G05D 1/00* | (2006.01) | |
| *H04N 5/268* | (2006.01) | |
| *H04N 5/272* | (2006.01) | |
| *H04N 5/38* | (2006.01) | |
| *H04N 7/08* | (2006.01) | |
| *H04B 13/02* | (2006.01) | |
| *G21C 17/013* | (2006.01) | |
| *H04N 23/90* | (2023.01) | |
| *H01F 27/02* | (2006.01) | |
| *H01F 27/12* | (2006.01) | |
| *H04W 84/12* | (2009.01) | |

(52) U.S. Cl.
CPC ......... *G05D 1/0094* (2013.01); *G21C 17/013* (2013.01); *H04B 13/02* (2013.01); *H04N 5/268* (2013.01); *H04N 5/272* (2013.01); *H04N 5/38* (2013.01); *H04N 7/0806* (2013.01); *H04N 23/90* (2023.01); *B63G 2008/005* (2013.01); *H01F 27/02* (2013.01); *H01F 27/12* (2013.01); *H04W 84/12* (2013.01)

(58) Field of Classification Search
CPC .... B63G 8/001; B63G 8/08; B63G 2008/005; H04N 5/247; H04N 5/268; H04N 5/272; H04N 5/38; H04N 7/0806; H01F 27/02; H01F 27/12; H04W 84/12; Y02E 30/30
See application file for complete search history.

(56) References Cited

U.S. PATENT DOCUMENTS

| | | | |
|---|---|---|---|
| 2011/0162573 A1* | 7/2011 | Race | H01Q 1/30 114/328 |
| 2014/0051352 A1 | 2/2014 | Wolfe et al. | |
| 2015/0346722 A1* | 12/2015 | Herz | G05D 1/0027 701/2 |
| 2016/0173833 A1 | 6/2016 | Siann et al. | |

* cited by examiner

SUBMERSIBLE INSPECTION DEVICE AND WIRELESS COMMUNICATION WITH A BASE STATION

TECHNICAL FIELD

The present invention generally relates to wireless communication with a submersible inspection device, and more particularly, but not exclusively, to wireless communication with submersible inspection drones used to evaluate electrical transformers.

BACKGROUND

Providing the ability to view wirelessly transmitted inspection images from a number of separate cameras on a remotely operated submersible remains an area of interest. Some existing systems have various shortcomings relative to certain applications. Accordingly, there remains a need for further contributions in this area of technology.

SUMMARY

One embodiment of the present invention is a unique submersible for inspection of a liquid filled housing such as an electrical transformer. Other embodiments include apparatuses, systems, devices, hardware, methods, and combinations for wirelessly transmitting information from a submersible drone. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
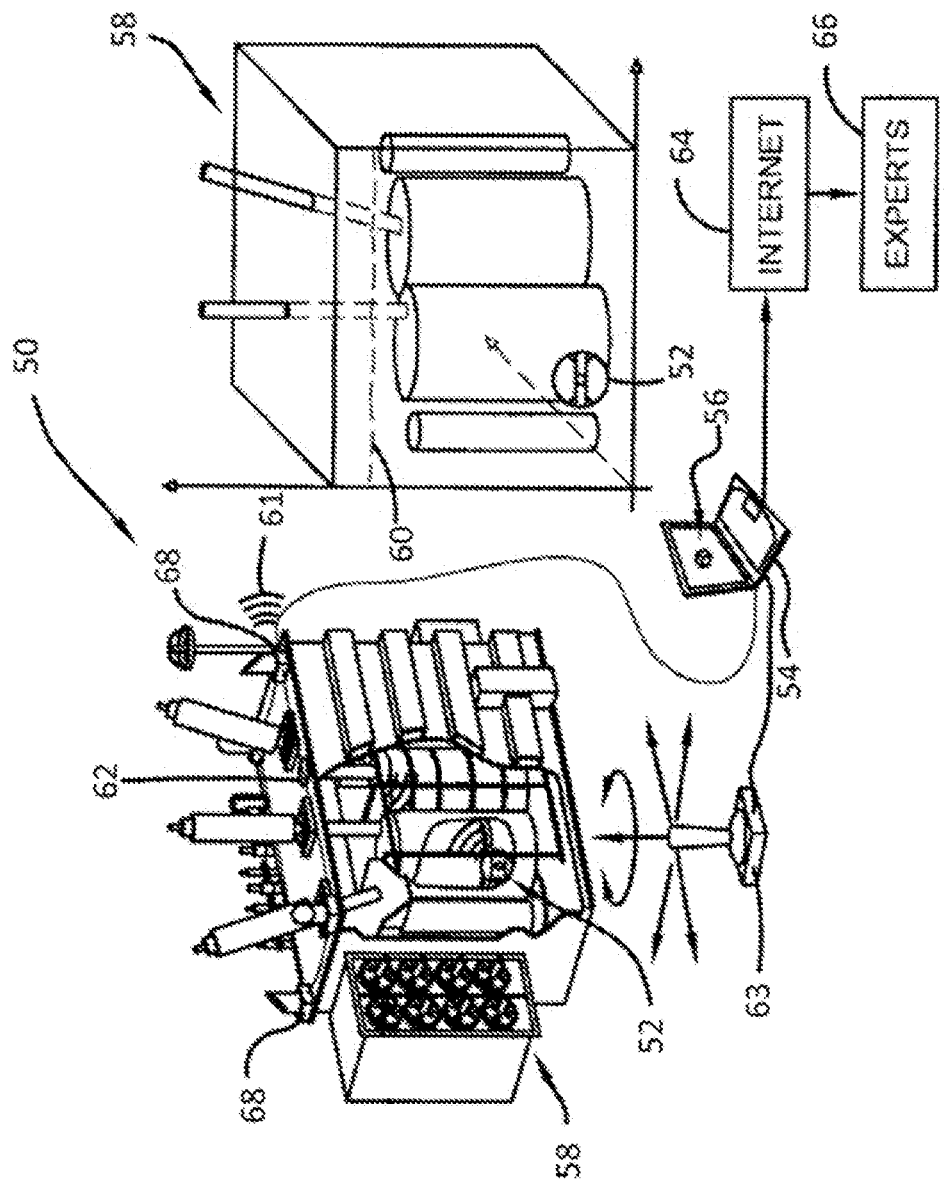
FIG. 1 depicts an embodiment of a submersible drone communicating with a base station.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, there is illustrated a system for in-situ inspection designated generally as 50. The system 50 generally includes an inspection device in the form of a submersible remotely operated vehicle (ROV) 52 which is wirelessly controlled from a control station which, in the illustrated embodiment, includes a computer 54 and a display 56. As used herein, the term "submersible" includes, but is not limited to, a vehicle capable of operation under the surface of a liquid body. Although much of the description that follows utilizes the term ROV for sake of brevity, it will be understood that the various embodiments described herein are not strictly limited to remotely operated vehicles, but can also be utilized with autonomous submersibles as well such as but not limited to those that are remotely triggered but are otherwise autonomous. For example, the inspection devices described herein can be static devices that observe and collect data whether remotely operated or in an autonomous configuration. Such a static device can be placed in its location as a result of operation of the ROV or autonomous device. Thus, embodiments of the device 52 are intended to cover a broad range of devices not simply limited to ROVs unless otherwise indicated to the contrary (as one non-limiting example, use of the term 'drone' is capable of covering ROV as well as autonomous devices 52 or static inspection drones useful for monitoring and/or inspection duties).

Of note in FIG. 1, the system 50 includes components generally on the left and bottom side of the figure, with the components on the upper right representing a schematic model of certain aspects of the system 50 (e.g. the tank in which the ROV 52 is operating) which will be understood by those of skill in the art. In many forms the submersible vehicles described herein are capable of operating in a container which maintains a fluid such as a pool or chemical storage tank, but in other forms can be a sealed container such as a tank. The liquid can take any variety of forms including water, but other liquid possibilities are also contemplated. By way of example, and not limitation, inspection may be performed on/in portions of ship hulls, electrical interrupters, high voltalge switch gears, nuclear reactors, fuel tanks, food processing equipment, floating roof storage system, chemical storage tank, or other apparatuses of similar nature.

The submersible ROV 52 shown in the illustrated embodiment is being used to inspect a tank for a transformer 58, but other applications are contemplated herein. Skilled artisans will appreciate that the inspection typically, but not exclusively, occurs only when the transformer 58 is offline or not in use. In many embodiments the transformer 58 utilizes its liquid as a cooling fluid 60 to maintain and disburse heat generated by the internal components during operation of the transformer. The cooling fluid 60 can be any liquid coolant contained within an electrical transformer, such as but not limited to a liquid organic polymer. Such liquid can therefore be transformer oil, such as but not limited to mineral oil. In other forms the transformer liquid can be pentaerythritol tetra fatty acid natural and synthetic esters. Silicone or fluorocarbon-based oils can also be used. In still other forms a vegetable-based formulation, such as but not limited to using coconut oil, may also be used. It may even be possible to use a nanofluid for the body of fluid in which the robotic vehicle is operating. In some embodiments, the fluid used in the transformer includes dielectric properties. Mixtures using any combination of the above liquids, or possibly other liquids such as polychlorinated biphenyls may also be possible.

As skilled artisans will appreciate, the transformer 58 is typically maintained in a sealed configuration so as to prevent contaminants or other matter from entering. As used herein, a "sealed configuration" of the tank allows for sealed conduits and/or ducts to be associated with the transformer's tank or housing to allow for connection to the electrical components and/or monitoring devices maintained in the tank. The tank is also provided with at least one opening to allow for the filling and/or draining of the cooling fluid. As shown in FIG. 1, a hole 62 can be an existing service hole, e.g. those used for filling the transformer oil and/or those used to enter a tank upon servicing by a technician. In general operation, the oil is inserted through any number of holes located in the top of the tank. Holes 62 may also be provided at the bottom of the tank to allow for the fluid to be drained. The holes 62 are provided with the appropriate plugs or caps. In some embodiments the hole 62 can be sized and structured such that the transformer tank top need not be unsealed completely or at all to introduce the submersible ROV 52. Accordingly, it will be appreciated that the size of the inspection device can be such that it can fit within a designated hole, whether the hole is the hole 62 depicted in the illustration or other types of access points discussed elsewhere herein and/or appreciated by those of skill in the art.

The ROV 52 is insertable into the transformer 58 or sealed container and is contemplated for purposes of the various embodiments herein as being movable utilizing un-tethered, wireless remote control. In the illustrated embodiment the computer 54 (depicted as a laptop computer in the illustrated embodiment although other appropriate computing devices are also contemplated) is contemplated to be in wireless communication with the ROV 52. A motion control input device, such as a joystick 63 is connected to the computer 54 and allows for a technician to control movement of the device 52 inside the transformer 58. Such control can be by visual awareness of the technician and/or by information made available via the display 56 (such as, but not limited to, a virtual model of the transformer 58). Other types of motion control input devices, such as used in video games, handheld computer tablets, computer touch screens or the like may be employed.

In some embodiments the computer 54 can be connected to another computer via a network, such as the depicted internet 64 as one example, so as to allow for the images or sensor data to be transferred to experts, who may be remotely located, designated by the block 66 so that their input can be provided to the technician so as to determine the nature and extent of the condition within the transformer and then provide corrective action as needed. In some embodiments, control of the ROV can also be transferred to an expert, who may be remotely located. In such embodiments, the expert would have another computer that can send control signals via a network to the local computer 54 that in turn sends signals to control the device 52 as described above.

The transformer 58 may be configured with a plurality of signal transmitters and/or receivers 68 mounted on the upper corners, edges or other areas of the transformer 58, or in nearby proximity to the transformer. The transmitters and/or receivers 68 are structured to send and/or receive a wireless signal 61 from the inspection device to determine the position of the inspection device in the transformer tank.

The transmitters and/or receivers 68 can be a transceiver in one embodiment, but can include a transmitter and antenna that are separate and distinct from one another in other embodiments. For example, the transmitter can be structured to send information using different frequencies/modulation/protocols/etc than an antenna is structured to receive. Thus as used herein, the term "transmitter" and "antenna" can refer to constituent parts of a transceiver, as well as standalone components separate and apart from one another. No limitation is hereby intended unless explicitly understood to the contrary that the term "transmitter" and/or "antenna" are limited to stand alone components unless otherwise indicated to the contrary. Furthermore, no limitation is hereby intended that the use of the phrase "transmitters and/or receivers" must be limited to separate components unless otherwise indicated to the contrary.

Informational data gathered by the ROV 52, and any associated sensor, can be transmitted to the computer 54 through the fluid and the tank wall with the openings 62. Use of different communication paths for difference aspects of the operation of the ROV 52 may be used to prevent interference between the signals. Some embodiments may utilize the same communication path to transfer data related to positioning, data information, and control information as appropriate.

Figure 2:
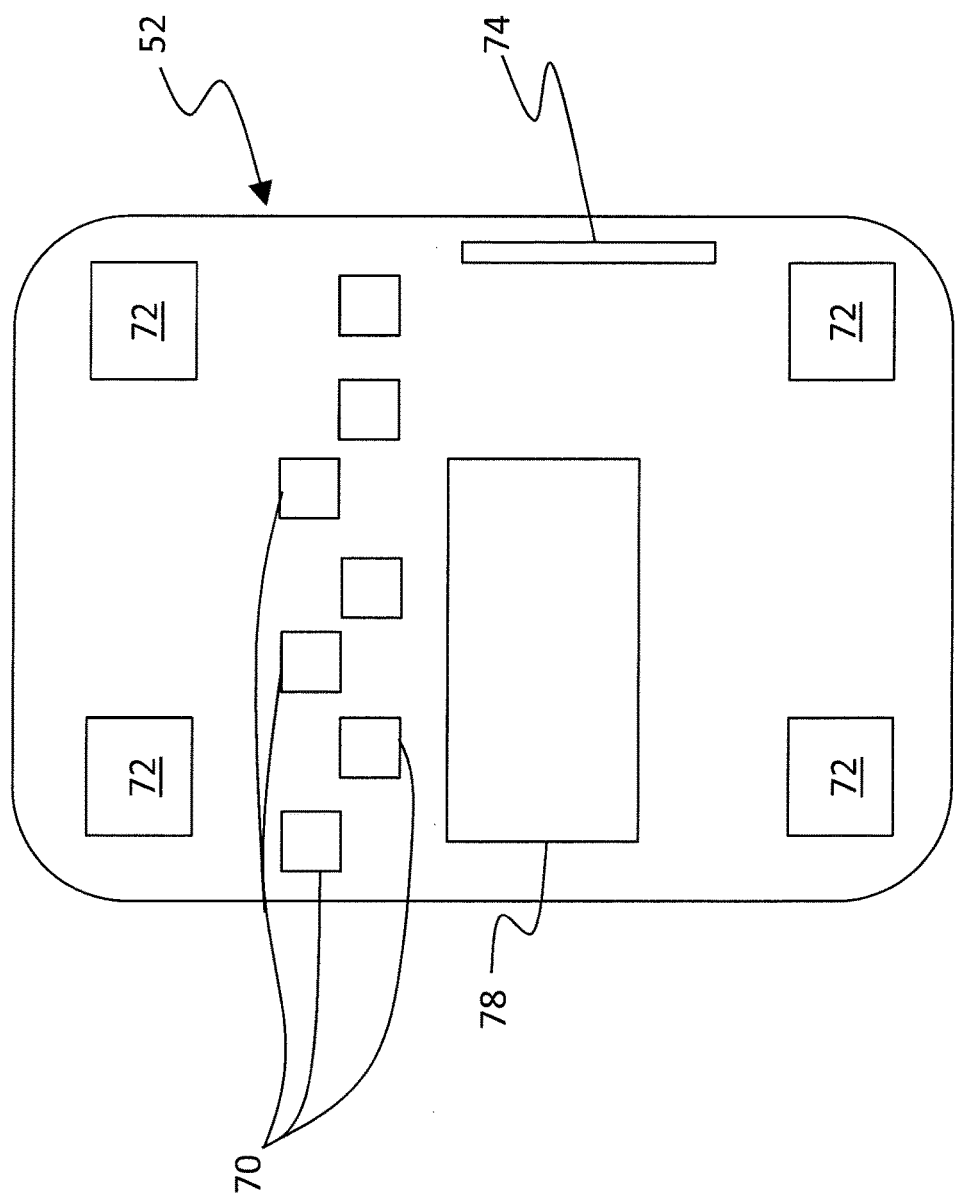
FIG. 2 depicts one embodiment of the submersible drone.

Turning now to FIG. 2, one embodiment of the ROV 52 is depicted as including cameras 70, motors 72 and transmitter and/or receiver 74. Other components may also be included in the ROV but are not illustrated for sake of brevity (e.g. a battery to provide power to the cameras, additional sensors such as rate gyros or magnetometers, etc). The cameras 70 are utilized to take visible and other wavelength images of the internal components of the transformer. In one embodiment of the ROV 52 a number of cameras are fixed in orientation and do not have separate mechanisms (e.g. a servo) two change their point of view. In other embodiments all cameras the ROV 52 have a fixed field of view and not otherwise capable of being moved. These images allow for technicians to monitor and inspect various components within the transformer. The cameras 70 can take on any variety of forms including still picture and moving picture cameras (e.g. video camera). Any number and distribution of the cameras 70 are contemplated. In one form ROV 52 can have an array of cameras 70 distributed in one region, but in other forms the cameras 70 can be located on all sides of the ROV 52. In some embodiments, the ROV 52 is provided with lights which facilitate illumination of the area surrounding the inspection device 52. In some embodiments the lights are light emitting diodes, but it will be appreciated that other illumination devices could be used. The illumination devices are oriented so as to illuminate the viewing area of one or more of the cameras 70. In some embodiments, the user can control the intensity and wavelength of the light.

The motors 72 are used to provide power to a propulsor (e.g. an impeller) which are used to control and/or provide propulsive power to the ROV 52. Each motor 72 can be reversible so as to control the flow of fluid or oil through the flow channels. Each motor can be operated independently of one another so as to control operation of an associated propulsor (e.g. a thruster pump) such that rotation of the pump in one direction causes the liquid to flow through the flow channel in a specified direction and thus assist in propelling ROV 52 in a desired direction. Other configurations of the propulsor are also contemplated beyond the form of a propeller mentioned above, such as a paddle-type pump which could alternatively and/or additionally be utilized. In some embodiments, a single motor may be used to generate a flow of fluid through more than one channel. In other words, a housing of the ROV 52 could provide just one inlet and two or more outlets. Valves maintained within the housing could be used to control and re-direct the internal flow of the fluid and, as a result, control movement of the ROV 52 within the tank. Fluid flow from the motor can also be diverted such as through use of a rudder, or other fluid directing device, to provide the steerage necessary to manipulate the vehicle. By coordinating operation of the motors with a controller, and thus the oil flowing through the housing of the ROV, the inspection device can traverse all areas of the transformer through which it can fit. Moreover, the ROV 52 is able to maintain an orientational stability while maneuvering in the tank. In other words, the ROV 52 can be stable such that it will not move end-over-end while moving within the transformer tank.

The transmitter and/or receiver 74 can be connected to a controller on board the ROV 52 for the purpose of transmitting data collected from the cameras 70 and also for sending and receiving control signals for controlling the motion and/or direction of the ROV 52 within the transformer. The transmitter and/or receiver 74 is structured to generate a wireless signal that can be detected by the computer or any intermediate device, such as through reception via the transmitter and/or receiver 68.

Other aspects of an exemplary remotely operated submersible which is operated in a fluid filled transformer tank described in FIG. 1 or 2 are described in international application publication WO 2014/120568, the contents of which are incorporated herein by reference.

Referring now to FIGS. 1 and 2, transmissions from either or both of the transmitters and/or receivers 68 and 74 can occur over a variety of manners, including various frequencies, powers, and protocols. In some applications the communication between the ROV 52 and the base station can be supplemented with a repeater or relay station, but not all embodiments need include such devices. The manners of transmission between 68 and 74 need not be identical in all embodiments. To set forth just a few examples, the transmitter and/or receiver 68 used for broadcast of signals from the base station can transmit in power that ranges from 1 W to 5 W. The base station can also transmit in frequencies that that range from about 300 MHz to about 5 GHz, and in some forms are at any of 300 MHz, 400 MHz, 433 MHz, 2.4 GHz, and 5 GHz. Transmission can occur using any variety of protocols/formats/modulation/etc. In one example, transmission from the base station can use digital radio communications such as that used for RC model cars/boats/airplanes/helicopters. The transmission can also occur as TCP/IP or UDP, it can occur over WiFi radios, serial communication over Bluetooth radios, etc. In one particular form, video transmissions can occur as streaming for a Wi-Fi camera over 2.4 GHz.

In much the same manner as the transmitter and/or receiver 68 of the base station, the transmitter and/or receiver of the ROV 52 can transmit in power that ranges from 250 mW to 3 W. The ROV 52 can also transmit in frequencies that that range from about 300 MHz to about 5 GHz, and in some forms are at any of 300 MHz, 400 MHz, 433 MHz, 2.4 GHz, and 5 GHz Transmission can occur using any variety of protocols/formats/modulation/etc. In one example, transmission from the base station can use digital radio communications such as that used for RC model cars/boats/airplanes/helicopters. The transmission could be video over IP, and one embodiment of IP could be WiFi/WLAN. In one non-limiting embodiment the transmission can therefore occur as TCP/IP or UDP, it can occur over WiFi radios, serial communication over Bluetooth radios, etc. In one particular form, video transmissions can occur as streaming for a Wi-Fi camera over 4.2 GHz. IN short, a variety of transmission techniques/approaches/protocols/frequencies/etc are contemplated herein.

Figure 3:
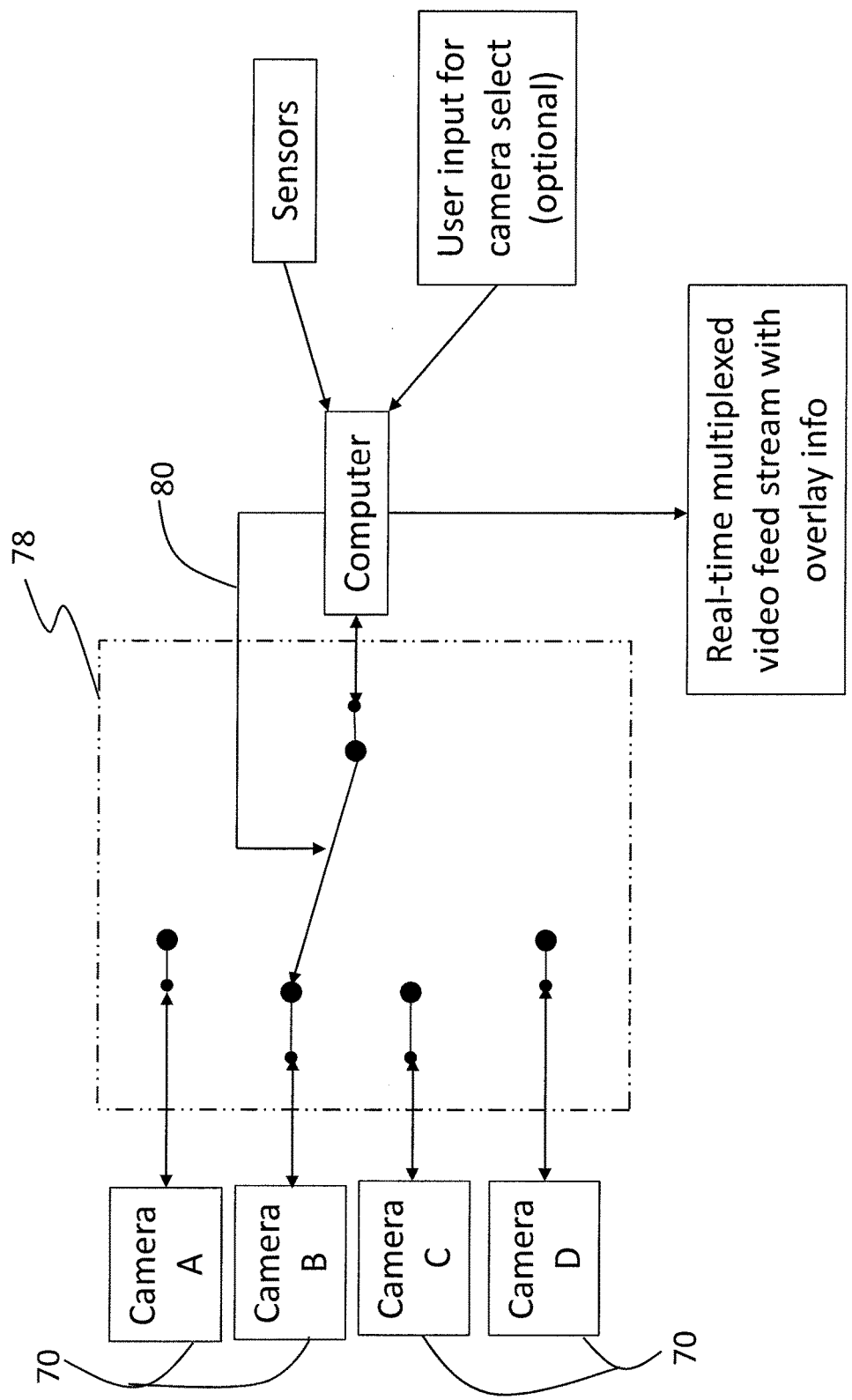
FIG. 3 depicts an embodiment of an input/output selector used with the submersible drone.

The ROV 52 also includes an input/output selector 78 useful to switch between any of the cameras 70 for transmission via the device 74, to the device 68 and thence to the display 56. One embodiment of the input/output selector 78 is illustrated in FIG. 3 which shows a switch controlled via 80. Generally speaking, the input/output selector 78 can be any device useful to select from a variety of inputs and provide a single output in one form. The selection can be dictated by a command from an operator (shown as 'optional' in the embodiment of FIG. 3), or from a computer based application. In this sense the selection can be an irregular spaced event separated by any size of time increment. Such an example is the selection of one camera by the technician/expert/operator from a number of potential camera sources on the transmitting end which can be displayed on a single television/computer monitor/etc.

In another embodiment the input/output selector 78 can be switched rapidly by a timer such as through a computer based multiplexer type of device. The input/output selector 78 can be operated in conjunction with (e.g. synchronized with) an input/output selector on a receiving end such as at the base station, such that rapid changes in selection of input source on the transmitting end can be matched with rapid changes in selection of output destination on the receiving end. Such is the case with a MUX/DEMUX configuration in which information from the multiple cameras of the remotely operated submersible can be rapidly switched for transmission to, for example, the base station, where a demultiplexer can rapidly be switched and a signal routed for independent display of the multiple cameras.

The input/output selector (either on the ROV 52 end or the base station end) can either be expressed as a separate piece of hardware independent of a central control processor, or can be a software program that runs within the central control processor (e.g. a controller on board the ROV 52). In one embodiment in which the input/output selector is a separate item of hardware, a serial connection can be made between the input/output device and a computer to which the switched images are relayed, but other connection types are also envisioned. In similar fashion, the cameras can be connected to the input/output device in similar serial communication connection, but other connection types are also contemplated.

A computer can be used to capture camera frames, resize them, overlay the requested information onto the video, encode the video and finally stream it over to the user. In one embodiment, the streaming software of motion images from the cameras can achieve 640×480 video at 20 frames per second with a latency less than 150 ms. The system (e.g. a controller, the input/output selector/etc) can be developed such that a user such as the technician or expert can change the video parameters at runtime so as to modify the stream parameters. For example, the resolution of the video can be changed manually or automatically based on the task of the robot. For slow movement inspection task, higher resolution, higher latency video can be selected. For fast steering movement, a lower resolution, lower latency and wider angle of view video can be selected. In some embodiments at runtime, higher resolution (for example 1296×972) video and images can be recorded locally to the ROV as and when directed by the operator, which can be done while the video stream is being transmitted. Much higher resolution (for example 1920×1080) pictures can be also taken but the video transmission may need to be paused.

In addition to switching the signal from any individual camera 70, other signals can be piggybacked on to the transmitted image, whether the image is a still shot or moving image. In one nonlimiting embodiment the additional signals piggybacked on to the transmitted image can include any type of sensor data available elsewhere from the ROV 52. Such additional signals can include orientation information of the ROV 52 (e.g. pitch, roll, yaw), battery life remaining, bus voltage, environment temperature and/or pressure, properties of the liquid within which the ROV 52 is operating, etc. The additional signals can be added to the camera image prior to or after the input/output selector has switched to an active image to be broadcast. The embodiment in FIG. 3 is capable of receiving information in this regard from sensors which are overlayed onto the switched camera selection before being transmitted to the base station.

One mode of operation of the system 50 that can be used in whole or in part to various embodiments described above progresses as follows: to ensure reliable communication between the device 52 and the computer 54, a transceiver 68 can be inserted into the cooling oil tank through the service opening on the top of the transformer. In most embodiments, the transceiver 68 is used to exchange data information from a sensor on the ROV and the camera 70, via a controller to the computer 54; and motion control or maneuvering signals from the joystick 63 via the computer 54 to the controller so as to operate the motors 72 and thrusters. The signal 84, transmitted by the receiver 82 is used by the computer 54 to provide a separate confirmation to the device's position within the tank.

The computer 54 receives the position signals and information signals and in conjunction with a virtual image correlates the received signals to the virtual image so as to allow a technician to monitor and control movement of the inspection device. This allows the technician to inspect the internal components of the transformer and pay particular attention to certain areas within the transformer if needed. By utilizing a virtual image of the internal features of the transformer and the position of the inspection device with respect to those virtual features, the image obtained can be matched with the corresponding site inside the actual transformer tank. Based on the visual representation of the transformer image and a possible virtual inspection device in relation to the image, a technician can manipulate the joystick 63 response. The computer 54 receives the movement signals from the joystick and transmits those wirelessly to the antenna 74, whereupon the controller implements internally maintained subroutines to control the pump thrusters to generate the desired movement. This movement is monitored in realtime by the technician who can re-adjust the position of the device 52 as appropriate.

Another mode of operation of the system 50 that can be used in whole or in part in various embodiments described above also progresses as follows: The base station can broadcast a control signal to be received by the ROV 52. The control signal can be any signal used to manipulate the remotely operated vehicle. For example, the control signal can be a signal to modulate the liquid propulsor (e.g. turn on, turn off, regulate speed, etc). The control signal can also be to control the input/output selector. For example, when the system 50 includes a limited receiving capability of a single television/computer monitor/etc on the receiving end, the control signal can be used by the user/base station to select a single camera for transmission to the base station.

Still other modes of operation that can be used in whole or in part in various embodiments described above include:
1. Recording all camera videos in high resolution in a memory on board the submersible. Uploading the videos to the remote operation station when better quality communication is available.
2. Replaying the videos at remote operation station and stitching multiple cameras to create a seamless panorama video for inspection. Allow engineer to select the ROI to zoom in. This application is for non-real time inspection typically.
3. Onboard computer can automatically switch between two or more cameras. A wide angle view video stitched from two or more cameras can be displayed to operator during the inspection. It can help the user to steer the robot.
4. Onboard computer can multiplex two or more video feeds in a known pattern interleaving the frames either for local (on craft) recording at high resolution and frame rate, or for transmission at lower resolution and frame rate. This can enable multiscopic or stereoscopic reconstruction and rectification of image data
5. The panorama video stitched from multiple cameras either online or offline (replay) can be displayed on VR device. It can provide immersive first person view to user.
6. The onboard computer or other image processing or manipulation device can multiplex between 2 or more video feeds, then combine the multiple feeds into a split frame image and transmit this as a single video feed. This increases potential frame rate while decreasing maximum resolution.
7. The onboard computer or other image processing or manipulation device can interleave frames of non-video information such as sensor data (e.g. acoustic, microphone, ultrasounds, thermography, rate gyro, magnetometer, etc), acoustic maps, point clouds etc. This data will need to be subject to handling such that it can be transmitted via the video transmission pipeline while avoiding contamination.
8. The multiplexing unit can be used to switch between static cameras with the same perspective but different image filters and processing capabilities to create a multilayer image stream, such as a video camera feed interleaved with thermal images, or video feed interleaved with depth information to create an RGBD camera stream One aspect of the present application provides an apparatus comprising a remotely operated submersible having: a liquid thruster used to propel and orient the remotely operated submersible, a signal receiver structured to receive commands through a liquid environment from a remote control station, a control circuit structured to receive a command transmitted to the signal receiver, the control circuit operable to control a fluid flow of the liquid thruster, a plurality of cameras each structured to capture a scene of electromagnetic energy, an input/output selector circuit for selecting the scenes of electromagnetic energy and composing a signal to be transmitted; and a signal transmitter structured to transmit the signal composed by the input/output selector circuit related to the scene of electromagnetic energy, the signal transmitter adapted to transmit information through a liquid environment while the remotely operated submersible is submerged with enough power to permit satisfactory reception at a receiving antenna.

A further aspect of the present application includes an apparatus comprising: a remotely operated submersible having a signal receiver structured to receive a command through a liquid environment from a remote control station, a plurality of cameras or sensors each structured to capture a target, an input/output selector circuit for selecting the captured targets and composing a signal to be transmitted, and a signal transmitter structured to transmit the signal composed by the input/output selector circuit related to the captured targets, the signal transmitter adapted to transmit information through a liquid environment while the remotely operated submersible is submerged with enough power to permit satisfactory reception at a receiving antenna.

A still further aspect of the present application includes an apparatus comprising a remotely operated submersible having: a signal receiver structured to receive a command through a liquid environment from a remote control station, a plurality of cameras each structured to capture a target, an input/output selector circuit for selecting the captured targets and composing a signal to be transmitted, and a signal transmitter structured to transmit the signal composed by the input/output selector circuit related to the captured targets, the signal transmitter adapted to transmit information through a liquid environment while the remotely operated submersible is submerged with enough power to permit satisfactory reception at a receiving antenna.

A feature of the present application provides wherein the signal receiver is a radio receiver, and wherein the signal transmitter is structured to provide radiofrequency transmissions.

Another feature of the present application provides wherein the radio receiver is structured to receive radiofrequency transmissions in a band between 300 MHz and 5 GHz.

Yet another feature of the present application provides wherein the signal receiver and the signal transmitter are included in a transceiver.

A further feature of the present application includes wherein the signal receiver and the signal transmitter are included in a transceiver, and which further includes a liquid thruster used to propel and orient the remotely operated submersible as well as a control circuit structured to receive a command transmitted to the signal receiver, the control circuit operable to control a fluid flow of the liquid thruster.

Still another feature of the present application provides wherein the liquid environment in which the signal transmitter is structured to transmit is an organic polymer liquid.

Yet still another feature of the present application provides wherein the input/output selector circuit is a signal switch structured to select an individual one of the plurality of cameras to form the signal to be transmitted.

Still yet another feature of the present application provides wherein the remotely operated submersible further includes a sensor capable of detecting a state of the remotely operated submersible.

A further feature of the present application provides wherein the signal to be transmitted includes information from the sensor and information related to the captured target in its transmission by the signal transmitter.

A still further feature of the present application includes a base station having a signal receiver complementary to the signal transmitter of the remotely operated submersible, and a signal transmitter complementary to the signal receiver of the remotely operated submersible, and wherein the remotely operated submersible is structured to operate in a tank that includes an electrical transformer submerged in the organic polymer liquid.

Yet a still further feature of the present application includes where the tank includes an electrical transformer submerged in the organic polymer liquid.

Another aspect of the present application provides an apparatus comprising a robotic drone structured to be operated beneath the surface and within a body of liquid, the robotic drone including a liquid propulsor for providing motive force to the drone, a radio transceiver structured to operate within the liquid for receiving commands and broadcasting data, a radio transmitter structured to broadcast a radiofrequency signal while the robotic drone is submerged in a liquid, a plurality of cameras structured to capture images from the robotic drone, an input/output selector circuit that can select which of the plurality of cameras to capture and broadcast via the radio transmitter.

A still further aspect of the present application includes an apparatus comprising a robotic drone structured to be operated beneath the surface and within a body of liquid, a radio transceiver structured to operate within the liquid for receiving commands and broadcasting data, a radio transmitter structured to broadcast a radiofrequency signal while the robotic drone is submerged in a liquid, a plurality of cameras structured to capture images from the robotic drone, an input/output selector circuit that can select which of the plurality of cameras to capture and broadcast via the radio transmitter.

A feature of the present application provides wherein the liquid is a dielectric liquid, and wherein the liquid propulsor is structure to operate in an electrical transformer coolant in the form of the dielectric liquid.

An additional feature of the present application provides wherein the liquid is a dielectric liquid, and wherein the liquid propulsor is structure to operate in tank filled with the dielectric liquid.

A further additional feature of the present application provides wherein the dielectric liquid is an electrical transformer coolant, and wherein the tank is an electrical transformer.

Another feature of the present application provides wherein the liquid propulsor is structured to provide propulsive power to the robotic drone by accelerating the dielectric liquid.

Still another feature of the present application provides wherein the radio transmitter is structured to provide a digital transmission formatted according to an internet protocol (IP) standard.

Yet another feature of the present application provides wherein the digital transmission is WiFi/WLAN.

Still yet another feature of the present application provides wherein the robotic drone is structured to broadcast a moving image with an overlay of drone data, and wherein the drone data overlay can include any one of a system parameter and sensor measurement.

Yet still another feature of the present application provides wherein the input/output selector circuit is a multiplexer structured to combine the images from the plurality of cameras for transmission to form the signal to be transmitted, and which further includes, a liquid propulsor for providing motive force to the drone.

A further feature of the present application includes a base station configured to include a base station receiver, the base station receiver structured to receive the radiofrequency signal broadcast from the radio transmitter.

A still further feature of the present application provides wherein the base station displays video from one of the plurality of cameras without the need of a demultiplexer.

Still another aspect of the present application includes a method comprising: opening a transformer tank which includes an electrical transformer submerged in a transformer liquid coolant within the tank, inserting a submersible robotic drone into the interior of the transformer tank, propelling the submersible robotic drone through a transformer liquid coolant in the transformer tank to inspect the electrical transformer, operating a plurality of cameras situated within the transformer tank as a result of placement by the submersible robotic drone, selecting a target camera from the plurality of cameras for transmission to a base station, the selecting accomplished via an input/output signal selector, and wirelessly transmitting information of the target camera provided via the input/output signal selector.

Yet still another aspect of the present application includes a method comprising: opening a tank which includes an object of inspection submerged in a liquid within the tank, inserting a submersible robotic drone into the interior of the tank, propelling the submersible robotic drone through a liquid in the tank to inspect the object of inspection, operating a plurality of cameras situated within the tank as a result of placement by the submersible robotic drone, selecting a target camera from the plurality of cameras for transmission to a base station, the selecting accomplished via an input/output signal selector, and wirelessly transmitting information of the target camera provided via the input/output signal selector.

One feature of the present application includes wherein the tank is a transformer tank, the object of inspection is an electrical transformer, and the liquid is a transformer liquid coolant.

A feature of the present application provides wherein the input/output selector is a switch, and which further includes switching between the plurality of cameras for transmission by a wireless transmitter.

Another feature of the present application provides wherein the switching is controlled by an operator at a base station.

Still another feature of the present application provides wherein the switching is accomplished by a multiplexer.

Yet another feature of the present application provides wherein the wirelessly transmitting includes broadcasting a radiofrequency signal from a wireless transmitter.

Yet still another feature of the present application further includes formatting the radiofrequency signal according to a WiFi standard.

Still yet another feature of the present application further includes receiving information related to the radiofrequency signal at a base station, and displaying an image from the target camera on a display.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
 a remotely operated submersible configured for inspection of one or more liquid cooled components within a tank and having:
  a signal receiver structured to receive a command through a liquid environment of the tank from a remote control station when the signal receiver is within the liquid environment of the tank when the remotely operated submersible is submerged within the tank, the liquid environment being a dielectric liquid;
  a plurality of cameras or sensors each structured to capture a target associated with the one or more liquid cooled components within the tank when the plurality of cameras is within the liquid environment of the tank;
  an input/output selector circuit for selecting the captured targets and forming a signal to be transmitted based on the captured targets selected; and
  a signal transmitter structured to transmit the signal formed by the input/output selector circuit based on the captured targets and while the remotely operated submersible is submerged, the signal transmitter adapted to transmit information through the liquid environment at a power for the information to be received at a receiving antenna.

2. The apparatus of claim 1, wherein the signal receiver is a radio receiver, and wherein the signal transmitter is structured to provide radiofrequency transmissions.

3. The apparatus of claim 2, wherein the signal receiver is structured to receive radio-frequency transmissions in a band between 300 MHz and 5 GHz.

4. The apparatus of claim 1, wherein the signal receiver and the signal transmitter are included in a transceiver, and which further includes a liquid thruster used to propel and orient the remotely operated submersible as well as a control circuit structured to receive a command transmitted to the signal receiver, the control circuit operable to control a fluid flow of the liquid thruster.

5. The apparatus of claim 1, wherein the liquid environment in which the signal transmitter is structured to transmit is an organic polymer liquid.

6. The apparatus of claim 5, wherein the input/output selector circuit is a signal switch structured to select an individual one of the plurality of cameras to form the signal to be transmitted.

7. The apparatus of claim 5, which further includes a base station having a signal receiver complementary to the signal transmitter of the remotely operated submersible, and a signal transmitter complementary to the signal receiver of the remotely operated submersible, and wherein the remotely operated submersible is structured to operate in a tank that is filled with the organic polymer liquid.

8. The apparatus of claim 7, wherein the tank includes an electrical transformer submerged in the organic polymer liquid.

9. The apparatus of claim 1, wherein the remotely operated submersible further includes a sensor capable of detecting a state of the remotely operated submersible or its environment.

10. The apparatus of claim 1, wherein the signal to be transmitted includes information from the sensor and camera information related to the captured target in its transmission by the signal transmitter.

11. An apparatus comprising:
 a robotic drone structured to be operated beneath a surface and within a body of liquid of a tank to inspect one or more components within the tank, the body of liquid being a dielectric liquid,
 a radio transceiver structured to operate within the liquid for receiving commands and broadcasting data,
 a radio transmitter structured to operate within the liquid and broadcast a radiofrequency signal while the robotic drone and radio transmitter are submerged in the liquid, a plurality of cameras structured to capture images from the robotic drone when the plurality of cameras is submerged with the robotic drone within the body of liquid of the tank, and an input/output selector circuit that can select which of the plurality of cameras to capture and broadcast via the radio transmitter at a power for the information to be received at a receiving antenna when the radio transmitter is submerged within the liquid.

12. The apparatus of claim 11, wherein the liquid propulsor is structure to operate in tank filled with the dielectric liquid.

13. The apparatus of claim 12, wherein the dielectric liquid is an electrical transformer coolant, and wherein the tank is an electrical transformer.

14. The apparatus of claim 11, wherein the liquid propulsor is structured to provide propulsive power to the robotic drone by accelerating the dielectric liquid.

15. The apparatus of claim 11, wherein the radio transmitter is structured to provide a digital transmission formatted according to an internet protocol (IP) standard.

16. The apparatus of claim 15, wherein the digital transmission is WiFi/WLAN.

17. The apparatus of claim 16, which further includes a base station configured to include a base station receiver, the base station receiver structured to receive the radiofrequency signal broadcast from the radio transmitter.

18. The apparatus of claim 17, wherein the base station displays video from one of the plurality of cameras without the need of a demultiplexer.

19. The apparatus of claim 15, wherein the robotic drone is structured to broadcast a moving image with an overlay of drone data, and wherein the drone data overlay can include any one of a system parameter and sensor measurement.

20. The apparatus of claim 15, wherein the input/output selector circuit is a multiplexer structured to combine the images from the plurality of cameras for transmission to form the signal to be transmitted, and which further includes a liquid propulsor for providing motive force to the drone.

21. A method comprising:
opening a tank which includes an object of inspection submerged in a liquid within the tank, the liquid being a dielectric liquid;
inserting a submersible robotic drone into the interior of the tank;
propelling the submersible robotic drone through the liquid in the tank to inspect the object of inspection, wherein the submersible robotic drone is configured to be propelled to traverse areas of the tank which the submersible robotic drone can fit;
operating a plurality of cameras situated within the tank as a result of placement by the submersible robotic drone, the plurality of cameras located on the submersible robotic drone and configured to capture the object of inspection;
selecting a target camera from the plurality of cameras for transmission of information of the target camera to a base station, the selecting accomplished via an input/output signal selector; and
while the submersible robotic drone is submerged, wirelessly transmitting the information of the target camera selected via the input/output signal selector at a power for the information to be received at a receiving antenna.

22. The method of claim 21, wherein the input/output selector is a switch, and which further includes switching between the plurality of cameras for transmission by a wireless transmitter.

23. The method of claim 22, wherein the switching is controlled by an operator at a base station.

24. The method of claim 22, wherein the switching is accomplished by a multiplexer.

25. The method of claim 22, wherein the wirelessly transmitting includes broadcasting a radiofrequency signal from a wireless transmitter.

26. The method of claim 25, which further includes formatting the radiofrequency signal according to a WiFi standard.

27. The method of claim 26, which further includes receiving information related to the radiofrequency signal at a base station, and displaying an image from the target camera on a display.

28. The method of claim 21, wherein the tank is a transformer tank, the object of inspection is an electrical transformer, and the liquid is a transformer liquid coolant.

* * * * *